No. 846,818. PATENTED MAR. 12, 1907.
R. BAGGALEY.
METHOD OF RECOVERING VALUES FROM FLUE DUST.
APPLICATION FILED DEC. 5, 1904.

2 SHEETS—SHEET 1.

WITNESSES
Warren W. Swartz

INVENTOR
Ralph Baggaley
by Bakewell Byrnes
his Attorneys

No. 846,818. PATENTED MAR. 12, 1907.
R. BAGGALEY.
METHOD OF RECOVERING VALUES FROM FLUE DUST.
APPLICATION FILED DEC. 5, 1904.

2 SHEETS—SHEET 2.

WITNESSES
Warren W. Swartz

INVENTOR
Ralph Baggaley
by Bakewell & Byrnes
his attorneys

UNITED STATES PATENT OFFICE.

RALPH BAGGALEY, OF PITTSBURG, PENNSYLVANIA.

METHOD OF RECOVERING VALUES FROM FLUE-DUST.

No. 846,818. Specification of Letters Patent. Patented March 12, 1907.

Application filed December 5, 1904. Serial No. 235,418.

*To all whom it may concern:*

Be it known that I, RALPH BAGGALEY, of Pittsburg, Allegheny county, Pennsylvania, have invented a new and useful Method of Recovering Values from Flue-Dust, of which the following is a full, clear, and exact description, reference being had to the accompanying drawings, forming part of this specification, in which—

Figure 1:
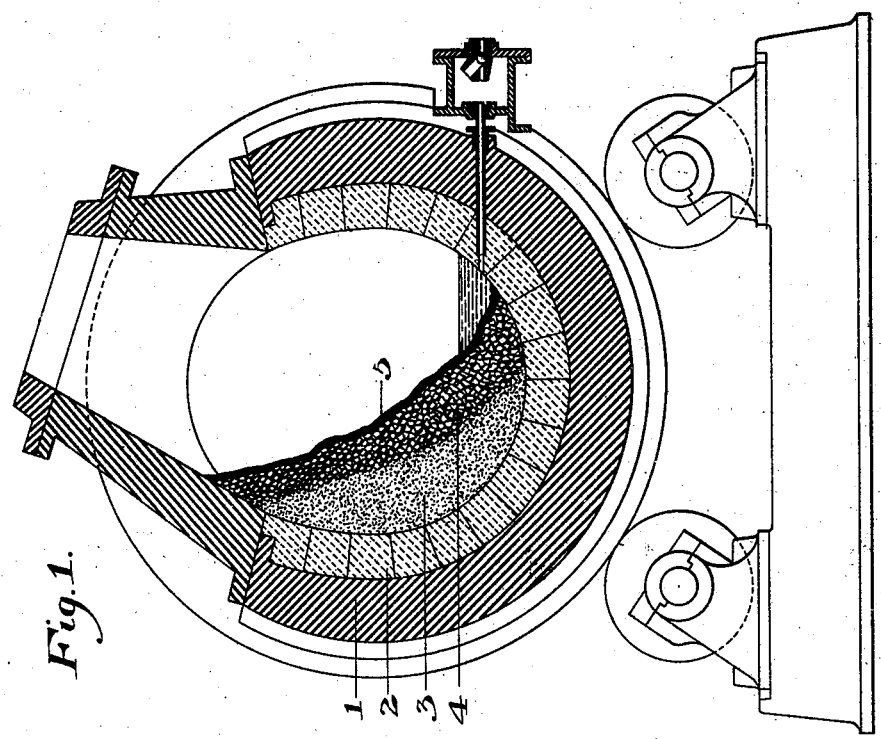
Figures 2, 3:
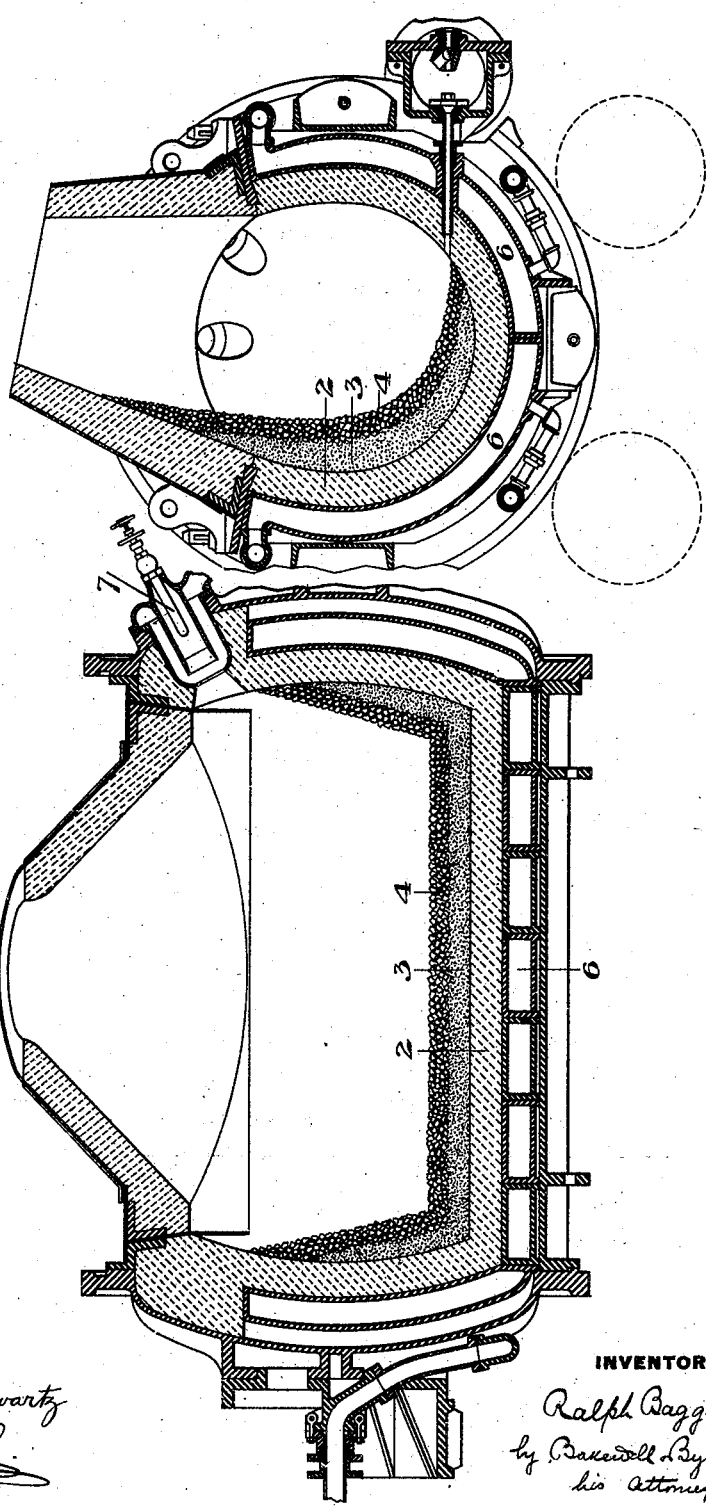

Figure 1 is a cross-section of a metal-block converter in which my invention may be successfully practiced. Fig. 2 is a cross-section of a water-jacketed converter which is also suitable for practicing my invention. Fig. 3 is a longitudinal section of the water-jacketed converter having oil-burners.

The object of my invention is to provide a cheap and efficient method of recovering practically all of the mineral values that are contained in flue-dust, resulting from the smelting, calcining, and converting of ores, and more especially copper ores.

It is well known that no satisfactory method at present exists for the recovery of metal values from flue-dust. In the treatment of copper ores the present practice consists almost universally in mixing flue-dust with some bonding agent or cement or in mixing flue-dust with fines or concentrates, which after also being mingled with some bonding agent are molded, usually by hand, into bricks and baked, or they may be briqueted by suitable machinery and then baked. In such form these bricks or briquets are fed into the ordinary copper-smelting blast-furnace with ores in the hope that they may thus reach the zone of fusion and become successfully melted and form a part of the molten matte. The cost of thus treating flue-dust prior to the effort to melt it will approximate one dollar per ton. The wear and tear on the briqueting machinery is necessarily heavy and expensive, because the quartzy nature of the material under treatment, and particularly of the fines and concentrates, quickly cuts out the metal molds and dies with which the briquets are pressed. The modern copper blast-furnace is purposely made high in order that a long travel may be provided between the charging-floor at which the charge enters and the level of the twyers at which it is melted. These furnaces are so operated that the charge will travel slowly downward from the charging-floor to the zone of actual fusion, and during this travel while heated red-hot it is subjected to enormous volumes of air-blast at low pressure as a means of calcining the charge within the furnace itself before fusion. This constitutes a portion of the method followed in present practice to bring ores up to a degree of richness through calcination, so that when in the molten condition they will yield a fifty-per-cent. matte, or at all events a matte not lower in grade than forty-five per cent. The present form of silica lining used in a converter cannot successfully handle a matte of lower grade, or, in other words, it cannot convert a matte of lower grade into finished blister-copper with the silica that it is possible to supply to the matte from a single lining. When briquets or hand-made bricks composed of flue-dust or of flue-dust mingled with fines and concentrates are thus fed into a blast-furnace with ores, these also become heated with the ore, and they are expected to travel in a red-hot condition slowly from the charging-floor down to the zone of fusion, and during the entire period of travel they are subjected to a strong blast of air. While some forms of ore may possibly maintain their integrity until the zone of fusion has been reached and may thus be reduced to a molten condition without serious mechanical loss, many kinds of ore, and particularly those delivered into the furnace in a finely-divided state, will have the fine particles quickly calcined, and being thus reduced in specific gravity will be carried by the blast out of the stack and will float away, causing a heavy mechanical loss. Such mechanical loss of ore and loss from volatilization are notoriously large in all silver-lead smelters, so that vast systems of flues and dust-chambers are essential in order to produce satisfactory commercial results.

In the case of briquets or hand-made bricks composed of flue-dust, fines, or concentrates the situation and the resultant losses are peculiarly aggravated because just as soon as they have been heated red-hot in the furnace the bonding agent of whatever character becomes destroyed. Hence each separate briquet in the furnace crumbles again to dust, and in this form the blast carries it up the stack, only to be again partially recovered in the dust-chambers and to be again briqueted and baked for another trial at melting. The carrying off of the dust thus becomes a continuous performance, and each time with heavy mechanical losses and heavy losses in volatilization. The proportion of flue-dust that reaches the zone of actual fusion in the furnace in the form of either brick or briquets, and thus becomes melted, so that its contained mineral values may be successfully recovered from the matter is very small.

My present invention is intended to correct all of these wasteful difficulties and to recover practically all of the mineral values contained in flue-dust, fines, or concentrates and to do this work successfully and completely at a single operation.

My preferred procedure is to utilize a large converter 1, (illustrated in Fig. 1,) composed of heavy metal blocks and preferably having a basic lining 2, composed of magnesite brick or other suitable material. The flue-dust, fines, or concentrates are then placed in this converter in a body 3 in their natural condition and without previous briqueting or other expense being added to them. The flue-dust may thus be placed in the converter for treatment either after having been mingled with raw ore or with concentrates or with fines, or it may be placed in the converter by itself and thereafter a capping of ore 4 placed over it, or it may be placed by itself in the converter, providing very careful treatment is thereafter given it.

I prefer mingling the flue-dust with raw ore of almost any kind before I place it in the converter, because it forms a homogeneous mass with the ore and cannot float to the surface during the subsequent treatment. My next preferred form of treatment would be to place a body of flue-dust in the converter and to then place over it a capping of ore to hold it down. My least-preferred form of procedure, although this, too, may be successfully practiced, would be to place the body of flue-dust in the converter by itself. Whichever of these three forms of procedure may be adopted, I thereafter run molten matte or slag, preferably the former, into the converter on top of this charge and allow the same to cool or to partially cool, as shown at 5, in order to cement the entire body of charge material firmly and securely to the side of the converter. If desired, when the molten matte or slag has been run into the converter the converter may thereafter be rotated on its trunnions backward and forward, so as to distribute the molten matte or slag in a layer entirely over the raw charge and to insure that the entire surface of the charge shall be thoroughly covered thereby. If desired, while the converter is thus in a partially-inverted position a mild blast of air may be delivered through the twyers in order to quicken the cooling and the cementing action. After this body of charge material has thus been cemented to the side of the converter I deliver on top of it a body of molten matte, which is preferably drawn from a small auxiliary melting-furnace or cupola or other source of supply, and the converter is then restored to its upright position, the converting-blast is turned on, and the converting process is continued until the entire raw-ore charge has been reduced to the molten condition practically without mineral loss and practically without need of carbonaceous fuel solely through the heat derivable from the oxidation of the combustible elements and compounds contained in the charge itself or in the molten bath. The operation will be greatly facilitated by utilizing a molten bath of matte that has been procured from the melting of sulfid ores. If desired, the process may be continued until blister-copper results. It will here be explained that by the term "cementing" is meant the treatment of the surface of the original charge so as to prevent flotation thereof when the molten matte is introduced into the converter.

The charge of raw material and the molten bath may be so predetermined by analysis that the entire molten bath will flux itself and that blister-copper may result from one operation and one charge. This, however, is not necessary, because within the spirit and the true intent of my invention other things may be added—such, for instance, as other fluxes, ores containing fuel values, ores containing an excess of silica or silica itself, lime, or iron.

Should the third form of procedure be followed—that is to say, should flue-dust alone be placed in the converter for treatment and for the recovery of its contained mineral values—then great care must be exercised in flowing the molten matte or slag slowly and in small quantity at a time over the surface of the body of flue-dust, and this molten matte or slag should be quickly and continuously cooled as it flows in a thin layer over the same, either by a mild blast from the twyers or by the simple cooling action of the atmosphere. As the specific gravity of the flue-dust is less than that of the molten matte or slag, the latter should not be run into the converter in considerable volume at one time, because it would then undermine the flue-dust, causing it to float on the surface of the molten matte or slag, and thus defeating the successful and complete recovery of the mineral values. Moreover, where flue-dust alone is thus placed in the converter and is thereafter cemented securely to the sides of the converter by means of a cementing layer of matte or slag the character of the molten bath with which the subsequent converting operation is performed must be somewhat different than where proper percentages of ore constitute an important proportion of the total charge in the converter.

I may use for practicing my process a converter having a water-jacket 6, as illustrated in Figs. 2 and 3, although I prefer this vessel constructed for the purpose with a thicker basic lining and a smaller water-jacket relatively to each other than those shown in those figures. In using this vessel I either place in it a large body of raw ore, through which is thoroughly mingled flue-dust from which it is desired to recover the values, or I may first place in it a body of flue-dust 3 unmixed with fines, concentrates, or ore and thereafter place a capping or layer of ore 4 entirely over the flue-dust. In either case I apply the auxiliary heat or flame from an oil-burner 7 over the entire surface of the ore, and I thus partially fuse the surface, so that it will cement or hold down the mingled ore or flue-dust or the body of flue-dust with the superimposed body of ore during subsequent treatment. Thereafter I run any desired volume of molten matte procured from an outside source into the converter. I restore the converter to its upright position and at the same instant I start the converting process. This quickly melts down any raw ore, fines, concentrates, or flue-dust, and if the converting process be further continued it will quickly produce blister-copper.

I prefer the use of the converter illustrated in Fig. 1, which is made of heavy metal blocks either alone or reinforced with a basic lining. Among its advantages are, first, it absorbs and conserves the heat instead of dissipating and wasting it, as is the case in any form of water-jacketed vessel; second, it does not require special attention or care in the final stages of the converting process and during the period when the molten contents of the vessel are liable to chill, as is the case with any water-jacket; third, the expense of an oil-supply and a water-supply is avoided by its use; fourth, the risk of having water near molten matte or slag is avoided.

The advantages of the water-jacketed converter, especially in the modified form above described, is that one may utilize a furious blast in it to almost any degree of intensity short of blowing the molten bath out of the vessel without fear of injury to the vessel itself. Oxygen is the only refining agent for copper, and a supply of oxygen is obtainable more cheaply from the atmosphere than from any other known source. It stands to reason, therefore, that the larger the volume of blast and the more quickly it is delivered into the vessel the more rapid will be the melting process and subsequently the refining process to blister-copper. In a vessel such as that shown in Figs. 2 and 3 I have successfully used a blast from three and one-half times to five times the volume that it would be possible to use safely in any of the various types of silica-lined or ore-lined converters that are now in universal use. I have so used this volume of blast without injury to the vessel and without any special care. In this manner I have successfully melted raw ore and reduced it to blister-copper 99.4 fine in fifty-five minutes. It is well known to those conversant with the metallurgy of copper and with the treatment of copper ores that it usually requires more time than this to reduce a fifty-per-cent. matte in the molten state to blister-copper in the silica or ore lined converter at present used.

My present invention renders the mechanical loss of flue-dust impossible. The dust is sealed down to the side of the converter with an impervious layer of congealed matte or slag or of fused ore, so that the blast cannot reach it and to mechanically expel it from the nose of the converter. Before the ore, concentrates, fines, or flue-dust are melted—that is, while the converting action is taking place—they quickly assume a plastic or spongy condition, which will not permit the blast to expel it from the nose of the converter and will not enable it to free itself and float on the surface of the molten bath. In short, by my present invention it is possible in a single operation to reduce every particle of the flue-dust to a molten condition and thereafter to extract all the contained mineral values—such as copper, gold, silver, nickel, cobalt, &c.—and this, too, with only the comparatively minute losses that may result from volatilization.

Doubtless many modifications will suggest themselves to those skilled in the art without departing from the spirit of my invention, since

What I claim is—

1. The method of recovering mineral values from finely-divided value-bearing material, which consists in placing it in a converter, cementing it therein to the walls of the converter; adding molten matte; blowing air into the matte and liquefying the dust thereby; substantially as described.

2. The method of recovering mineral values from finely-divided value-bearing material, which consists in placing it in a converter; cementing it therein with a layer of fusible material; adding molten matte; blowing air into the matte and liquefying the dust thereby; substantially described.

3. The method of recovering mineral values from finely-divided value-bearing material, which consists in placing it in a converter; covering it with coarser value-bearing material; cementing the charge; adding molten matte; blowing air into the matte and liquefying the charge thereby; substantially as described.

4. The herein-described method of recovering values from finely-divided value-bearing material, consisting in placing a charge of the material in a converter, cementing the charge therein, introducing a molten bath upon the cemented surface of the charge, and then heating the converter and continuing the converting process until the charge has been taken up by the bath.

5. The herein-described method of recovering values from finely-divided value-bearing material, consisting in placing a charge of material in a converter, introducing the molten material into the charge and permitting the same to cool to cement the charge within the converter, then introducing a molten bath upon the surface of the cemented charge, and then heating the converter and continuing the converting process until the charge has been taken up by the bath.

6. The herein-described method of recovering values from finely-divided value-bearing material, consisting in placing a charge of the material within a converter, then introducing molten material upon the surface of the charge without undermining the same, then oscillating the converter to distribute the molten material over the surface of the charge and permitting the same to cool to cement the charge, then introducing a molten bath upon the cemented surface of the charge, and then heating the converter and continuing the converting process until the charge has been taken up by the bath.

7. The herein-described method of recovering values from finely-divided value-bearing material, consisting in placing a charge of material in a converter, then slowly spreading molten material upon the surface of the charge without undermining the same and permitting it to cool to cement the charge, then introducing a molten bath upon the cemented surface of the charge, and then heating the converter and continuing the converting process until the charge has been taken up by the bath.

8. The herein-described method of recovering values from finely-divided value-bearing material consisting in placing a charge of material in a converter, cementing the charge within the converter, then introducing molten material upon the surface of the charge without undermining the same and permitting it to cool to cement the charge, delivering a blast of air through the twyers to hasten the cooling and cementing action, then introducing a molten bath upon the cemented surface of the charge, and then heating the converter and continuing the converting process until the charge has been taken up by the bath.

9. The herein-described method of recovering values from finely-divided value-bearing material, consisting in placing a charge of the material in a converter, then placing a layer of coarser fusible material upon the charge to prevent floating of the latter, then placing molten material upon the coarser material and permitting the same to cool to cement the charge within the converter, then introducing the molten bath upon the cemented surface of the charge, and then heating the converter and continuing the converting process until the charge is taken up by the bath.

10. The herein-described method of recovering values from finely-divided value-bearing material, consisting in placing a charge of the material in a converter, then placing a layer of molten material upon the surface of the charge without undermining the latter, oscillating the converter to distribute the molten material over the surface of the charge, delivering a blast of air through the twyers to cool the molten material and cement the charge, then introducing a bath of molten material upon the cemented surface of the charge, and then heating the converter and continuing the converting process until the charge has been taken up by the bath.

11. A step in the recovery of finely-divided value-bearing material, which consists in cementing the material in a converter prior to subjecting it to a converting process.

12. A step in the recovery of finely-divided value-bearing material, which consists in placing the material in a converter and treating the surface thereof so as to prevent flotation of the material prior to subjecting it to a converting process.

13. The method of recovering values from finely-divided value-bearing material, which consists in placing a charge of the material in a converter, treating the surface of the material to prevent flotation thereof, introducing molten matte upon the treated surface of the charge, and then blowing air into the matte and liquefying the value-bearing material.

14. The herein-described method of recovering values from finely-divided value-bearing material, consisting in placing a charge of material in a converter, introducing a molten bath upon the surface of the charge, said surface of the charge being treated prior to the introduction of the molten bath to prevent flotation of the material upon the bath, and then heating the converter and continuing the converting process until the charge has been taken up by the bath.

In testimony whereof I have hereunto set my hand.

RALPH BAGGALEY.

Witnesses:
 Azelle E. Hobart,
 William M. Kirkpatrick.